(12) United States Patent
Denike et al.

(10) Patent No.: US 6,389,553 B1
(45) Date of Patent: May 14, 2002

(54) REDUNDANT LINK DELAY MAINTENANCE CIRCUIT AND METHOD

(75) Inventors: David William Denike, Nepean; David G. Martin, Clarenville, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/083,999

(22) Filed: May 26, 1998

(51) Int. Cl.[7] .................................................. H04L 1/22
(52) U.S. Cl. .............................. 714/6; 714/13; 375/372
(58) Field of Search ................................. 375/354, 372; 370/503, 508, 511; 711/154, 155; 714/2, 6, 9, 12, 13

(56) References Cited

U.S. PATENT DOCUMENTS

| 4,429,386 A | | 1/1984 | Garden ....................... 370/100 |
| 4,821,227 A | * | 4/1989 | Naito ......................... 364/900 |
| 4,894,827 A | | 1/1990 | Ramsay et al. .............. 371/8.2 |
| 4,928,275 A | * | 5/1990 | Moore et al. ................ 370/102 |
| 5,157,696 A | | 10/1992 | Hara ........................... 375/100 |
| 5,327,430 A | * | 7/1994 | Urbansky ..................... 370/84 |
| 5,329,557 A | * | 7/1994 | Suzuki et al. ................ 375/112 |
| 5,392,318 A | | 2/1995 | Ellis et al. ................... 375/118 |
| 5,598,445 A | * | 1/1997 | Castano Pinto et al. ..... 375/372 |
| 5,680,422 A | * | 10/1997 | Burch et al. ................. 375/371 |
| 6,240,106 B1 | * | 5/1998 | Banu et al. .................. 375/372 |
| 5,761,203 A | * | 6/1998 | Morales ....................... 370/418 |
| 6,067,304 A | * | 5/2000 | Nishioka ...................... 370/516 |

* cited by examiner

Primary Examiner—Stephen Chin
Assistant Examiner—Dac V. Ha (57) ABSTRACT

A system and method for maintaining a constant delay when a switch between two or more possible input data streams is made. Data received on a selected stream is buffered as it is received, the timing of this buffering being based on link timing recovered from the selected stream. Stable local timing information is generated from the link timing. It is stable in the sense that it is subject to only a very small shift when a switch in the selected data stream is made. Data is then read from the buffer on the basis of the local timing information thereby producing an output stream with a constant delay.

28 Claims, 5 Drawing Sheets

REDUNDANT LINK DELAY MAINTENANCE CIRCUIT AND METHOD

FIELD OF THE INVENTION

The invention relates to methods and systems for interconnecting a circuit with a set of two or more redundant circuits.

BACKGROUND OF THE INVENTION

It is common for communications circuits to come in redundant pairs in which one of the pair is active at a given time. Should the active circuit fail, the second circuit takes over the role of the active circuit. If such a redundant pair is communicating with a third circuit, conventional systems include a first link from the first of the redundant pair to the third circuit and a second link from the second of the redundant pair to the third circuit. While improving technology is making the circuits themselves faster, cheaper and more reliable, the electrical interconnect for such links between circuits is on the other hand more mature. The cost of multi-card circuits can be reduced, and the reliability improved, by reducing the amount of interconnect between the circuits. This may be done by time-multiplexing various data streams that flow between the circuits into serial, high-speed data links.

Typically in a scenario in which a redundant pair of circuits is connected to a third circuit over first and second time multiplexed links, the delay over the first link is different from the delay over the second link, and as such when the active circuit of the redundant pair is switched the timing of the data received by the third circuit changes.

This presents a problem in delay sensitive functions, such as some wireless transmission paths, in which the delay in the transmit path must be fixed and deterministic. This also presents a problem if the third circuit requires constant timing.

SUMMARY OF THE INVENTION

It is an object of the invention to obviate or mitigate one or more of the above identified disadvantages.

According to a first broad aspect, the invention provides an apparatus comprising: a data buffer; a link receiver for receiving an input data stream and for recovering link timing information from the input data stream, and for writing the input data stream to the data buffer on the basis of the link timing information; local timing circuitry for generating stable local timing information from the recovered link timing information and for reading data from the data buffer on the basis of the local timing information and for outputting this in an output data stream.

According to a second broad aspect, the invention provides an apparatus comprising: a data buffer; a link receiver for receiving an input data stream and for recovering link timing information from the input data stream, and for writing the input data stream to the data buffer on the basis of the link timing information; local timing circuitry for generating stable local timing information from the recovered link timing information and for reading data from the data buffer on the basis of the local timing information and for outputting this in an output data stream.

According to a third broad aspect, the invention provides a method of maintaining a stable delay variation in a circuit which is connected to receive an input data stream which is subject to delay variation, the method comprising the steps of: receiving data from the input data stream; generating link timing information on the basis of the selected data stream; writing the received data to a data buffer on the basis of the link timing information; generating relatively stable local timing information on the basis of the link timing information; and reading data from the data buffer on the basis of the local timing information and outputting the read data in an output data stream.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
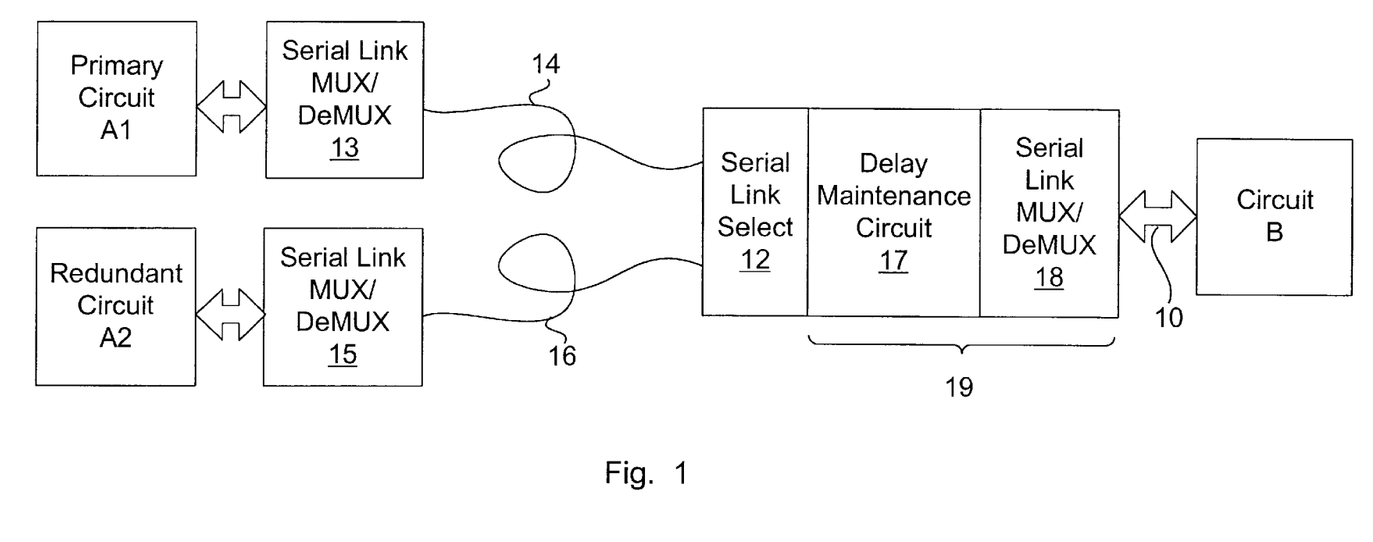
FIG. 1 is a block diagram of a connection between a pair of redundant circuit cards and another circuit card according to an embodiment of the invention.

Referring firstly to FIG. 1, an embodiment of the invention is shown schematically in which two redundant circuits A1,A2 are connected to a third circuit B over a single communications link 10 is shown. The redundant circuits comprise primary circuit A1 and redundant circuit A2.

Primary circuit A1 is connected to a serial link select circuit 12 through a serial link MUX/deMUX (multiplexer/demultiplexer) 13 and a serial link 14, and redundant circuit A2 is connected to the link select circuit 12 through a serial link MUX/deMUX 15 and a serial link 16. The serial link select circuit 12 is connected through a delay maintenance circuit 17 provided by an embodiment of the invention to a serial link MUX/deMUX circuit 18 which is connected to the communications link 10. While the serial link MUX/deMUX circuit 18 and the delay maintenance circuit 17 are shown as two separate entities, in practice they may be combined in a single circuit which will be referred to as an interface circuit 19.

The link select circuit 12 simply selects a data stream from one of the two serial links 14,16 and passes this on as an input data stream to the delay maintenance circuit 17.

Figure 2:
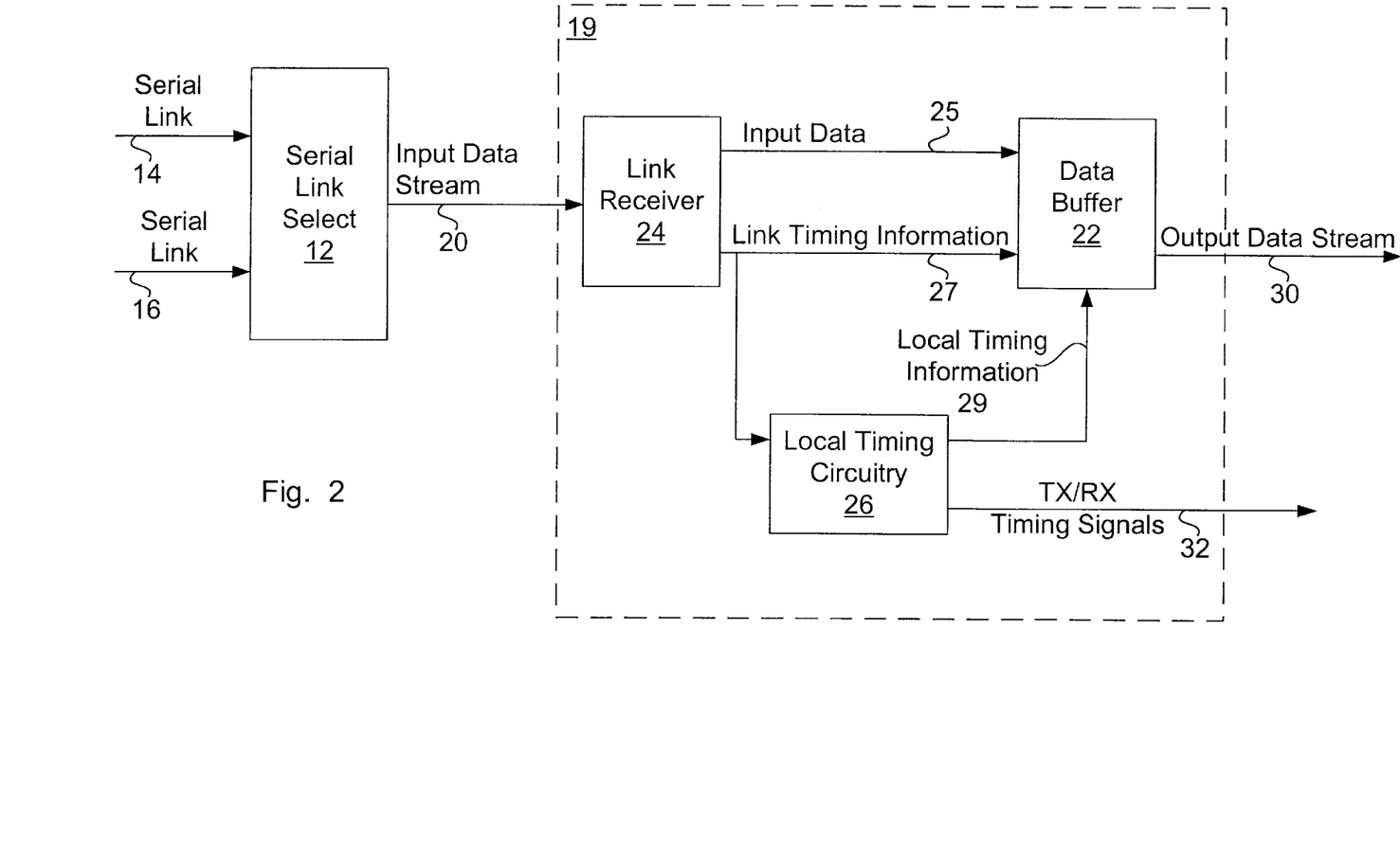
FIG. 2 is a high level block diagram of the link delay maintenance circuit block of FIG. 1, according to an embodiment of the invention.

Referring now to FIG. 2, the interface circuit 19 is shown connected to the link select circuit 12 to receive an input data stream 20, this being the data stream on the selected one of the two serial links 14,16. The interface circuit 19 comprises a data buffer 22, link receiver 24, and local timing circuitry 26. The link receiver 24 receives the input data stream 20 and extracts or recovers various link timing information signals 27, and passes one or more of these to the data buffer 22 and also passes one or more of those to the local timing circuitry 26. In addition, the link receiver 24 has a data output 25 connected to the data buffer 22 which carries the data received through the input data stream 20. The outputs of the interface circuit 19 consist of an output data stream 30 from the data buffer 22, and TX/RX timing signals 32 from the local timing circuitry 26.

It is assumed that the data on the selected link (14 or 16) is divided into frames or blocks. This blocking could be imbedded into the data stream, or it may be indicated on separate signals. The link receiver 24 is used to identify the frame boundaries in the input data stream 20. Received data is written to the data buffer 22.

The data buffer 22 is used to hold data received in the input data stream 20. The data buffer 22 provides delay compensation for any delay variations between the two links 14,16. The data buffer 22 provides storage for one frame of data. Data is input to the data buffer 22 at the start of the buffer, and then cycles through the buffer. The link timing information 27 is used to control when data is written to the data buffer 22. The link timing information 27 may for example consist of link frame indications whenever a frame boundary is detected in the input data stream 20. In this case, the point where data is input to the data buffer 22 is reset to the start of the buffer whenever a link frame boundary is detected by the link receiver 24. Data is output from the data buffer 22 beginning at the start of the buffer. The local timing circuitry 26 generates stable local timing information 29 from the recovered link timing information 27 and uses this to control when data is read and output from the data buffer 22. The local timing information is stable in the sense that it will shift very little when a switch in the selected data stream is made, the shift preferably having a maximum equal to the period of a bit in the input data stream 20. The local timing information 29 might for example consist of local frame indications and a local word clock in which case the output point in the data buffer 22 is reset to the start of the buffer whenever a local frame indication is received from the local timing circuitry 26.

When one of the two incoming serial links 14,16 is first selected, the local timing circuitry 26 is initialized, so that the locally generated output data stream 30 has a predetermined timing offset from the input data stream 20. This offset is chosen to lag the incoming data by the amount of time required to fill about half of the data buffer 22. This results in the data buffer 22 remaining about half full, so that about half of the contents of the data buffer contain data that has been received from the link, but not yet retrieved from the data buffer.

When an alternate incoming link is subsequently selected, the timing of the data written to the buffer 22 could vary, depending on the delay differences between the primary and redundant links 14,16, or timing alignment differences between the primary and secondary data sources. The local timing circuitry 26 maintains the local timing established with the initially selected link possibly with a very small shift. As a result, the output timing on the output side of the data buffer 22 changes minimally.

Figure 3:
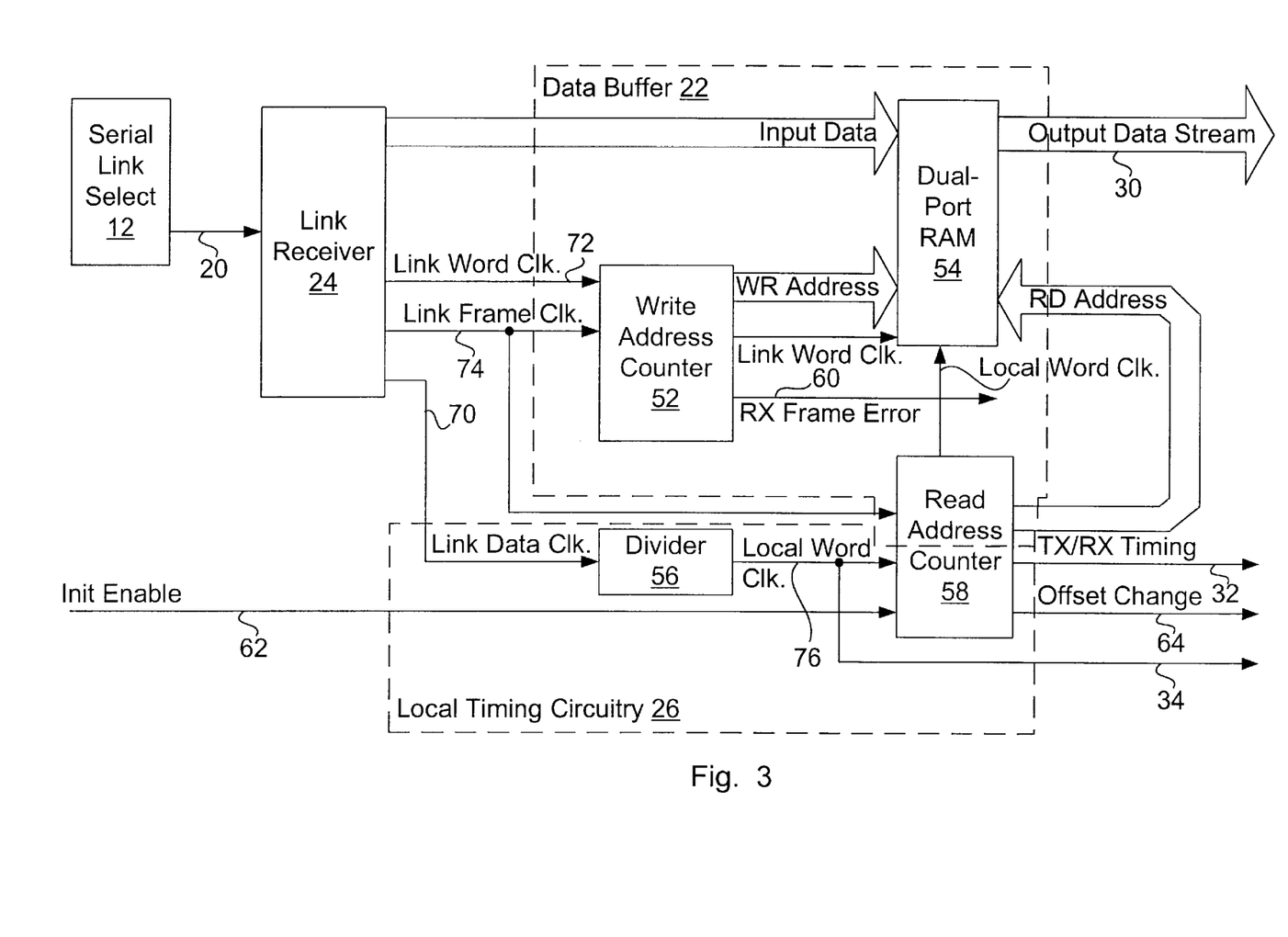
FIG. 3 is a more detailed block diagram of a preferred implementation of the link delay maintenance circuit block of FIG. 1.

FIG. 3 is a detailed block diagram of one possible specific implementation of the interface circuit 19. The functionality in this detailed block diagram has been mapped onto that of the link receiver 24, data buffer 22, and local timing circuitry 26 of FIG. 2. The components of the detailed block diagram include the link receiver 24, a write address counter 52 and dual-port RAM 54 both forming part of the data buffer 22, a divider 56 forming part of the local timing circuitry 26, and a read address counter 58 whose functionality is partly that of the data buffer 22 and partly that of the local timing circuitry 26. In the discussion which follows, the terms introduced in FIG. 2 will for the most part not be used.

The output of the serial link select circuit 12, this being the input data stream 20, is passed to the link receiver 24. The link receiver 24 performs link de-multiplexing and decoding, and translates the link serial data stream into the data words that are to be stored in the dual-port RAM 54. It is assumed that the dual-port RAM is addressable by word for this example. The link receiver 24 also extracts and outputs a link data clock (serial bit clock) 70 from the serial data on the link, and generates and outputs a link word clock 72 which is used to time the writing of the data words into the dual-port RAM 54. Finally, the link receiver 24 detects frame markers in the received data stream and outputs a link frame clock 74 on this basis. For this embodiment, the link data clock 70, the link word clock 72 and the link frame clock 74 collectively comprise the link timing information 27 of FIG. 2.

The link data clock 70 contains a clock pulse for every received bit. The link word clock 72 contains a clock pulse for every received word. Assuming that there are N bits in a word, the link word clock will be 1/N times the frequency of the link data clock. Assuming that there are M words in a frame, the link frame clock will be 1/M times the frequency of the link word clock. Every Mth link word clock pulse is aligned with a link frame clock pulse. When a switch between data streams is made, the link data clock, the link word clock, and the link frame clock all are generated on the basis of the new data stream.

Figure 4:
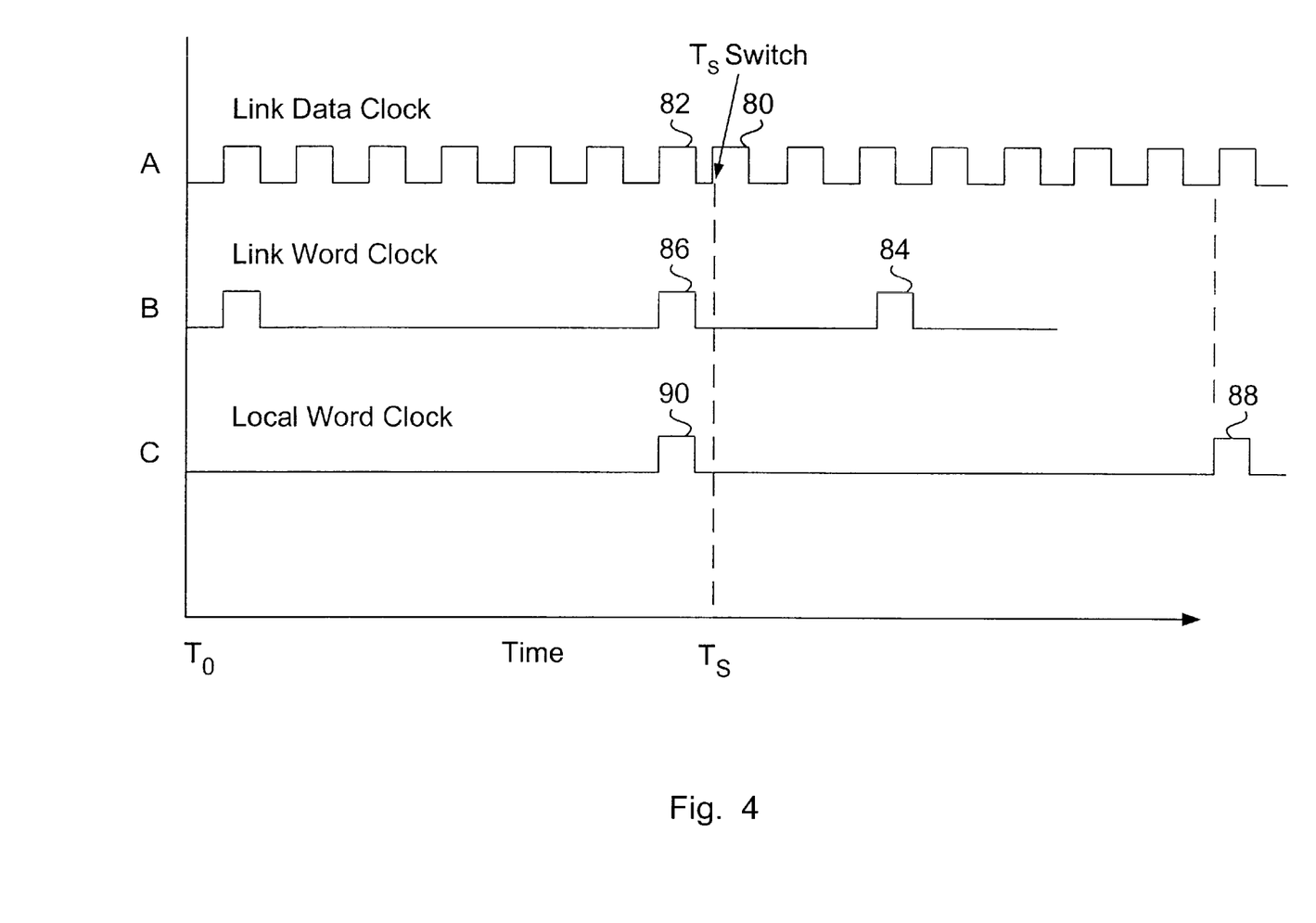
FIG. 4 is a clock timing diagram for a link data clock, link word clock, and local word clock.

The link data clock 70 is passed to the divider 56 which generates a local word clock 76 from the link data clock by dividing the link data clock by the number of bits in a word, N. This may be done, for example, by counting link data clock pulses and generating a local word clock pulse every N pulses in the link data clock. When a switch between data streams is made, the local word clock 76 does not reset, but rather continues to count up to N. Thus, after a switch the local word clock 76 and the link word clock 72 will likely not be aligned. This is illustrated by several clock pulse sequences shown in FIG. 4. In sequence A, a clock pulse sequence for the link data clock 70 is shown. In sequence B, a clock pulse sequence for the link word clock 72 in shown. Finally, in sequence C, a clock pulse sequence for the local word clock 76 is shown. It is assumed that at time $T_0$, the link word clock sequence B and the local word clock sequence C are aligned. At time $T_S$, a switch in the selected data source is made. The link data clock and the link word clock are both then determined from the newly selected data source. The timing of the first link data clock pulse 80 after time $T_S$ is arbitrary with respect to the timing of the last link data clock pulse 82 before time $T_S$. Similarly, the timing of the first link word clock pulse 84 after time $T_S$ is arbitrary with respect to the timing of the last link word pulse 86 before time $T_S$. However, through the use of divider 56, the first local word clock pulse 88 after time $T_s$ will always be exactly N link data clock pulses after the last local word clock pulse 90 before time $T_S$. The result of all of this is that the local word clock is relatively stable across a data source switch over. More precisely, the local word clock 76 will never shift more than the period of the link data clock 70.

The write address counter 52 generates addresses for data written to the dual-port RAM 54. The dual-port RAM 54 is addressable by word, and contains memory space for a full frame of data. Since the frame contains M words, there are M possible addresses A(1)=1, A(2)=2, . . . A(M)=M. The write address counter 54 simply sequentially counts from 1 to M making a count increment/roll-over each time a link word clock pulse is received from the link receiver 24. It is cleared back to 1 when a link frame clock pulse is received from the link receiver 24 or after it counts up to M. Each time a link word clock pulse is received by the write address counter 52, a new write address is generated and the most recently received word is written to the dual-port RAM 54 to the location identified by the new write address. The link word clock 72 is also passed through the write address counter 52 to the dual-port RAM 54 and clocks the new input data into the new write address.

Preferably, an RX frame error output 60 is provided from the write address counter 52 which outputs error flags under certain conditions. The write address counter 52 may for example produce an error flag if the counter is not about to roll over when the receive frame boundary is detected (i.e. when a link frame clock pulse is received), or if it rolls over with no receive frame boundary detected. This provides monitoring of the receive link integrity.

The read address counter 58 provides local frame clock generation. It also generates read addresses for the dual-port RAM 54 for data which is to be read and output by the delay maintenance circuit. The read address counter 58 has a counter which counts local word clock pulses received from the divider 56. When it reaches M, the number of data words in a frame, it outputs a local frame pulse on the TX/RX timing output 32 and resets itself (rolls over). Each time a local word pulse is received, the read address is incremented and output to the dual-port RAM 54. The dual-port RAM then reads the data at the read address and outputs it as a TX data transfer as part of the output data stream 30. The local word clock 76 is also passed through the read address counter 58 to the dual-port RAM 54 and clocks the reading of data from the new read address. As with the write address counter, the read address counter counts from A(1) through to A(M). When enabled by the init-enable signal received on an init enable input line 62, the read address counter 58 will initialize to a preset value when the link receiver 24 detects a link frame boundary. This is done to establish an initial local frame timing offset with respect to the link frame timing. It is preferred that a local frame pulse be generated when the dual-port RAM 54 is about half-full, i.e. about half a frame after a link frame pulse. This can be achieved by selecting the preset value to be a read address count about half way between A(1) and A(M).

Preferably, the read address counter 58 also receives the link frame clock 74 pulse stream. Each time a link frame boundary is detected by the link receiver 24, the read address counter 58 latches the read address counter value in a software readable register, so that software can determine the offset in the link timing. The read address counter may also generate an alarm if the offset between the input and output frame timing changes. The read address counter may have an "offset change" output 64 which can be used to output such an alarm.

In the above described embodiment, the local word clock 72 is generated by dividing the link data clock 70 by the word size. Alternatively, a local link data clock may be generated using a PLL-based local clock generation circuit. This can be used to minimize the instantaneous change in the locally generated link data clock signal and minimize the total change to the local word clock signal.

In the above described embodiments, a read address counter and write address counter are used to generate read addresses and write addresses respectively. Of course, counters are not required to implement this functionality. Any read address generator and write address generator circuitry/logic software capable of keeping track of the appropriate next read/write data buffer locations are suitable.

Figure 5:
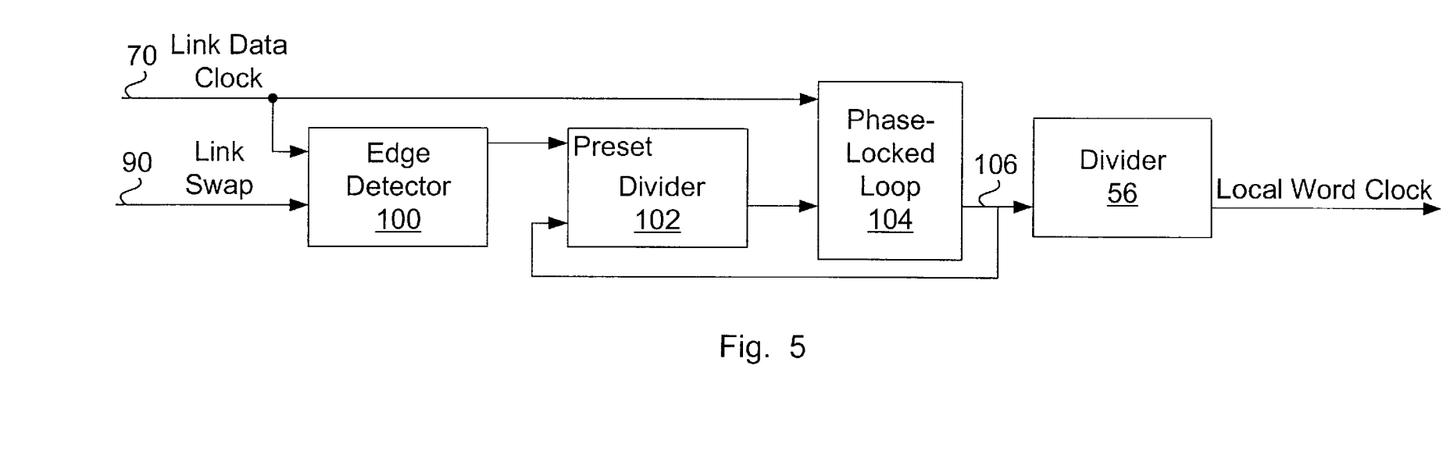
FIG. 5 is a block diagram of a circuit to perform PLL-based local clock generation.

An example of a PLL-based local clock generation circuit is shown in FIG. 5. The PLL-based circuit consists of an edge detector 100 connected to receive the link data clock 70 and a signal 90 indicating when a link swap occurs, a divider 102 having a preset input connected to receive an output of the edge detector 100, and a phase-locked loop 104 connected to receive the link data clock 70 and an output of the divider 102. The phase locked loop produces the local link data clock 106. The local link data clock 106 is passed back to the divider 102 and is also passed to the divider 56 described previously which generates the local word clock.

In the above described embodiment, one of two serial bit streams is input to the link delay maintenance circuit. The selected bit stream is converted to words for storage in the data buffer and for subsequent parallel output. More generally, the input bit streams may be parallel bit streams of width Winput; the selected one of these may be converted to a parallel bit stream of width Wbuffer, where Wbuffer is the address resolution of the data buffer; and the output bit stream may be a parallel bit stream of width Woutput. The width Winput needs to be less than the width Wbuffer such that local buffer read timing can be generated which contains minimal variations due to changes in input timing due to input switch overs.

The various steps which must be performed based upon differences between Winput, Wbuffer, and Woutput are fairly self explanatory. In the described example, Winput is one, and Wbuffer and Woutput are equal to each other.

If Winput is different from Wbuffer, then a conversion is made in the link receiver.

Similarly, if Woutput is different from Wbuffer, then a conversion is made at the output of the data buffer. For example, if Woutput is one, and Wbuffer is eight, then a parallel to serial conversion step needs to be performed at the output. If Woutput is eight and Wbuffer is sixteen, then an additional step of dividing each word read from the buffer into two separate data transfers must be performed. If Woutput is sixteen and Wbuffer is eight, then an additional step of combining every two buffer outputs into a single data transfer must be performed.

More generally, some sort of high frequency link timing signal is recovered from an incoming data stream and low frequency link timing signal(s) are also recovered from the incoming data stream. The low frequency link timing signal (s) are used to control when data is written to the data buffer. In addition, a stable low frequency local timing signal is generated as a function of the higher frequency timing signal. It is stable in the sense that it is not based upon the low frequency link timing signal(s) and is thus only susceptible to variations in the high frequency link timing signal, and these are small even during a switch over. Data is read from the data buffer on the basis of the low frequency local timing signal.

In a variation, link frame timing may be embedded in the data stream that is written to the data buffer. Local frame generation would then be provided by detecting the frame boundary as data is retrieved from the data buffer.

In another variation, the data in the data buffer does not necessarily need to be retrieved sequentially. It could be retrieved in some other sequence to aid in the separation of the various data streams that were multiplexed together on the serial link.

Numerous modifications and variations of the present invention are possible in light of the above teachings. It is therefore to be understood that within the scope of the appended claims, the invention may be practised otherwise than as specifically described herein.

The embodiments of the invention in which an exclusive property or privilege is claimed are defined as follows:

1. An apparatus comprising:
   a data buffer;
   a link receiver for receiving an input data stream and for recovering link timing information from the input data stream, and for writing the input data stream to the data buffer on the basis of the link timing information;
   local timing circuitry for generating stable local timing information from the recovered link timing information and for reading data from the data buffer on the basis of the local timing information and for outputting this in an output data stream.

2. An apparatus according to claim 1 wherein:
   the input data stream is divided into frames;
   the link timing information comprises link frame boundary indications, and the local timing information comprises local frame boundary indications;
   the link receiver writes data to the data buffer at an input point which is sequentially incremented through the buffer until a link frame boundary is indicated at which point the input point is reset to the beginning of the data buffer; and
   the local timing circuitry comprises a read address generator which reads data from the data buffer at an output point which is sequentially incremented through the buffer until a local frame boundary is indicated at which point the output point is reset to the beginning of the data buffer, and for outputting this read data in the output data stream.

3. An apparatus according to claim 2 wherein the link receiver receives the input data stream as a serial data stream and converts this to a parallel word data stream, the data buffer is addressable by word, and the parallel word data stream is written to the data buffer sequentially by word.

4. An apparatus according to claim 3 wherein the link timing information comprises a link word clock containing a clock pulse for every word of data received in a given frame, and the link word clock is used to clock the writing of words of data into the data buffer.

5. An apparatus according to claim 4 wherein the output data stream is also a parallel word data stream and wherein the local timing information comprises a local word clock containing a clock pulse for every word of data to be output, and the local word clock is used to clock the reading of words of data from the data buffer.

6. An apparatus according to claim 4 wherein the output data stream is a serial data stream and wherein the local timing information comprises a local word clock containing a clock pulse for every word of data to be output in serial form, and the local word clock is used to clock the reading of words of data from the data buffer.

7. An apparatus according to claim 2 wherein the link timing information comprises a link data clock containing a clock pulse for each bit in the received data stream, and wherein the local frame indications are generated as a function of the link data clock pulses without regard to where a link frame boundary may exist.

8. An apparatus according to claim 6 wherein the link timing information comprises a link data clock containing a clock pulse for each bit in the received data stream, the link word clock contains a clock pulse for every word's worth of received serial data and is reset when a link frame boundary is detected, and wherein the link timing information comprises a local word clock pulse generated for every word's worth of received serial data, and a local frame indication generated for every frame's worth of local word pulses.

9. An apparatus according to claim 2 further comprising means for tracking an offset between local frame boundaries and link frame boundaries and for outputting an error signal as a function of changes in this offset.

10. An apparatus according to claim 2 further comprising means for tracking when the input point should be reset as a function of the number of words being written to the data buffer, and for outputting a frame error signal when a link frame boundary indication is not generated at that time.

11. An apparatus according to claim 1 wherein the selected data stream is a parallel data stream of width Winput; the link receiver includes means for converting this to a parallel data stream of width Wbuffer, where Wbuffer is the address resolution of the data buffer; and the output data stream is a parallel data stream of width Woutput, the width Winput being less than the width Wbuffer such that the low frequency local timing signal contains minimal variations due to changes in input timing.

12. A method of maintaining a stable delay variation in a circuit which is connected to receive an input data stream which is subject to delay variation, the method comprising the steps of:
    receiving data from the input data stream;
    generating link timing information on the basis of the selected data stream;
    writing the received data to a data buffer on the basis of the link timing information;
    generating relatively stable local timing information on the basis of the link timing information; and
    reading data from the data buffer on the basis of the local timing information and outputting the read data in an output data stream.

13. A method according to claim 12 wherein the input data stream is divided into frames, and the link timing information comprises link frame boundary indications, and the local timing information comprises local frame boundary indications;
    said writing step comprises writing the input data to the buffer at an input point which is sequentially incremented through the buffer until a link frame boundary is indicated at which point the input point is reset to the beginning of the data buffer; and
    said reading step comprises reading the output data from the data buffer at an output point which is sequentially incremented through the buffer until a local frame boundary is indicated at which point the output point is reset to the beginning of the data buffer, and for outputting this read data in the output data stream.

14. A method according to claim 12 wherein the input data stream is a serial data stream further comprising the step of:
    converting the input data stream into a parallel word data stream, and writing the parallel word data stream to the data buffer sequentially by word.

15. A method according to claim 12 wherein the link timing information comprises a link word clock containing a clock pulse for every word of data received in a given frame, and the link word clock is used to clock the writing of words of data into the data buffer.

16. A method according to claim 15 wherein the link timing information comprises a link data clock containing a clock pulse for each bit in the received data stream, the link word clock contains a clock pulse for every word's worth of received serial data and is reset when a link frame boundary is detected, and wherein a local word clock pulse is generated for every word's worth of received serial data, and a local frame indication is generated for every frame's worth of local word pulses.

17. A method according to claim 13 wherein the link timing information comprises a link data clock containing a clock pulse for each bit in the received data stream, and wherein the local frame indications are generated as a function of the link data clock pulses without regard to where a link frame boundary may exist.

18. An apparatus comprising:
a link select circuit adapted to receive two redundant input data streams and output a selected data stream;
a data buffer adapted to provide delay compensation for any delay variations between the two redundant input data streams;
a link receiver for receiving the selected data stream and for recovering link timing information from the selected data stream, and for writing the selected data stream to the data buffer on the basis of the link timing information; and
local timing circuitry for generating stable local timing information from the recovered link timing information and for reading data from the data buffer on the basis of the local timing information and for outputting this in an output data stream;
whereby when a switch in the selected data stream from one of said two redundant input data streams to another of said two redundant input data streams occurs, the output data stream is substantially unaffected notwithstanding the delay variations.

19. An apparatus according to claim 18 wherein:
the selected data stream is divided into frames;
the link timing information comprises link frame boundary indications, and the local timing information comprises local frame boundary indications;
the link receiver writes data to the data buffer at an input point which is sequentially incremented through the buffer until a link frame boundary is indicated at which point the input point is reset to the beginning of the data buffer; and
the local timing circuitry comprises a read address generator which reads data from the data buffer at an output point which is sequentially incremented through the buffer until a local frame boundary is indicated at which point the output point is reset to the beginning of the data buffer, and for outputting this read data in the output data stream.

20. An apparatus according to claim 19 wherein the link receiver receives the selected data stream as a serial data stream and converts this to a parallel word data stream, the data buffer is addressable by word, and the parallel word data stream is written to the data buffer sequentially by word.

21. An apparatus according to claim 20 wherein the link timing information comprises a link word clock containing a clock pulse for every word of data received in a given frame, and the link word clock is used to clock the writing of words of data into the data buffer.

22. An apparatus according to claim 21 wherein the output data stream is also a parallel word data stream and wherein the local timing information comprises a local word clock containing a clock pulse for every word of data to be output, and the local word clock is used to clock the reading of words of data from the data buffer.

23. An apparatus according to claim 21 wherein the output data stream is a serial data stream and wherein the local timing information comprises a local word clock containing a clock pulse for every word of data to be output in serial form, and the local word clock is used to clock the reading of words of data from the data buffer.

24. An apparatus according to claim 23 wherein the link timing information comprises a link data clock containing a clock pulse for each bit in the received data stream, the link word clock contains a clock pulse for every word's worth of received serial data and is reset when a link frame boundary is detected, and wherein the link timing information comprises a local word clock pulse generated for every word's worth of received serial data, and a local frame indication generated for every frame's worth of local word pulses.

25. An apparatus according to claim 19 wherein the link timing information comprises a link data clock containing a clock pulse for each bit in the received data stream, and wherein the local frame indications are generated as a function of the link data clock pulses without regard to where a link frame boundary may exist.

26. An apparatus according to claim 19 further comprising means for tracking an offset between local frame boundaries and link frame boundaries and for outputting an error signal as a function of changes in this offset.

27. An apparatus according to claim 19 further comprising means for tracking when the input point should be reset as a function of the number of words being written to the data buffer, and for outputting a frame error signal when a link frame boundary indication is not generated at that time.

28. An apparatus according to claim 18 wherein the selected data stream is a parallel data stream of width Winput; the link receiver includes means for converting this to a parallel data stream of width Wbuffer, where Wbuffer is the address resolution of the data buffer; and the output data stream is a parallel data stream of width Woutput, the width Winput being less than the width Wbuffer such that the low frequency local timing signal contains minimal variations due to changes in input timing.

* * * * *